Feb. 23, 1965        G. E. KEEFER        3,170,679
REVERSE FLOW APPARATUS FOR COMBUSTION FURNACE
Filed July 20, 1962        4 Sheets-Sheet 2

INVENTOR.
GEORGE E. KEEFER
BY
J. R. Nelson
and W. A. Schaich
ATTORNEYS

Feb. 23, 1965 G. E. KEEFER 3,170,679
REVERSE FLOW APPARATUS FOR COMBUSTION FURNACE
Filed July 20, 1962 4 Sheets-Sheet 3

INVENTOR.
GEORGE E. KEEFER
BY J. R. Nelson
and W. A. Schaich
Attorneys though unit is located and for directing a supply of air in sequence to first one Venturi section and then the other Venturi section.

United States Patent Office 3,170,679
Patented Feb. 23, 1965

3,170,679
REVERSE FLOW APPARATUS FOR COMBUSTION FURNACE
George E. Keefer, Sylvania, Ohio, assignor to Owens-Illinois Glass Company, a corporation of Ohio
Filed July 20, 1962, Ser. No. 211,253
17 Claims. (Cl. 263—15)

The present invention relates to the art of combustion furnaces. More particularly, the present invention relates to regenerative-type combustion furnaces. The invention will be described and illustrated in the drawings as in connection with a glass melting furnace, although the invention is not to be considered as limited thereto since the features thereof will be of utility in connection with other combustion operations wherein regeneration principals are beneficially employed.

As is well known, a regeneration-type furnace employs regeneration chambers on opposed sides of the furnace. The regeneration chambers are used to store heat absorbed from the hot waste gases or products of combustion which are caused to flow through the regeneration chambers in sequence by appropriate control of the draft system employed. According to customary practice the gaseous flow, within the furnace proper and the opposed regenerator chambers, is periodically reversed in order that the regeneration chambers are sequentially exposed to the hot exhaust gases and to cool inlet combustion air drawn from the atmosphere. The regeneration chambers are filled with an array of ceramic, refractory or brick blocks which are so stacked as to leave voids for the passage of the hot waste gases or the cool inlet air therethrough. As a consequence, the so-provided large surface area of brick work, which is commonly referred to as "checkers," absorbs heat as the exhaust gases are passed therethrough and this heat is then subsequently liberated to the inlet combustion air when the draft flow system is reversed.

The present invention most particularly has to do with an apparatus for efficiently effecting a reversal of the flow in the regenerative-type furnace system. There are many known mechanisms and valves for effecting reversal of flow. However, most of those known have many undesirable aspects which it is a principal object of the present invention to overcome.

One type of known reversal apparatus consists essentially of a butterfly valve. The butterfly valve leaves much to be desired, however, as it does not make an effective seal and, consequently, the thermal efficiency is considerably less than the theoretical optimum. Furthermore, furnaces of the regenerative-type are fairly large and considerable amounts of gases, both of the inlet air and of the outgoing combustion gases, are involved. It can be appreciated, therefore, that the various passageways, ducts, openings and the like must themselves be quite massive in order to handle these volumes. As a consequence and also because of the considerable heat involved, warpage of the massive valve elements occurs, further reducing the sealing efficiency. The butterfly valves are also operationally expensive due to their size and due to the involved bearing structure necessary to support them.

Resort has also been had to various and sundry shifting types of ductwork arrangements, but these unfortunately have also been accompanied by excessive leakage, leading to thermal inefficiency. The shifting type of ductwork, known heretofore, also require considerable applied cooling in order to avoid warpage which otherwise leads to mechanical jamming in operation. Finally, the reversal mechanisms, known heretofore, have been known to require extensive, and therefore expensive, maintenance.

It is an important object of the present invention to provide a reversing type valve for effecting reversal of flow in regenerative-type furnace system, which valve is of relatively simple construction.

It is also an object of the present invention to provide such a reversing type valve which at the same time incorporates a Venturi feature, thereby serving to expedite the exhausting of waste gases and the introduction of fresh combustion air.

It is likewise an object of the present invention to provide a reversing type valving apparatus which is composed of relatively simple elements which can be easily assembled to furnish an efficiently operable mechanism.

It is still another object of the present invention to provide a reversal apparatus for a regenerative-type furnace which simultaneously effects reversal of flow in an inlet stack and in an exhaust stack, the reversal being capable of accomplishment quickly and easily with less than the normal time lag.

It is another object of the present invention to provide a regenerative furnace reverse-flow, draft-induced exhaust and inlet apparatus which requires a minimum of attention, maintenance and is capable of automatic timed control.

It is yet another object of the present invention to provide a Venturi type reversing valve which permits a greater efficiency of operation than possible heretofore while, at the same time, the operation is accomplished with a minimum of moving parts.

The above enumerated objects, as well as many others, will become apparent to those skilled in the art from the following detailed description taken in conjunction with the annexed sheets of drawings on which there is presented, for purposes of illustration only, several embodiments of the reversing valving apparatus of the present invention.

As has been indicated hereinabove, the reversible valving apparatus in accordance with this invention is of particular utility in connection with the regenerative furnace wherein it is beneficial to effect the reversal of the gaseous flow, leaving the regeneration chambers and the gaseous flow being introduced to the regeneration chamber, said reversal taking place simultaneously. In its simplest embodiment the reversing valving apparatus of the present invention includes a chamber duct which comprises a first Venturi section capable of expediting flow in one direction and a spaced second Venturi section expediting flow in the opposite direction, in combination with control means for directing a supply of air in sequence to first one Venturi section and then the other Venturi section and, in addition, a third conduit for connecting first the one Venturi section and then the other Venturi section with the stack on opposite side of the opposite Venturi section. In a preferred embodiment the control or deflection means for alternate direction of the supply of air takes the form of a shiftable sleeve member which reciprocates from a lower position to an upper position, thereby connecting the stack on one side of a Venturi section directly to the opposite Venturi and vice versa.

Figure 1:
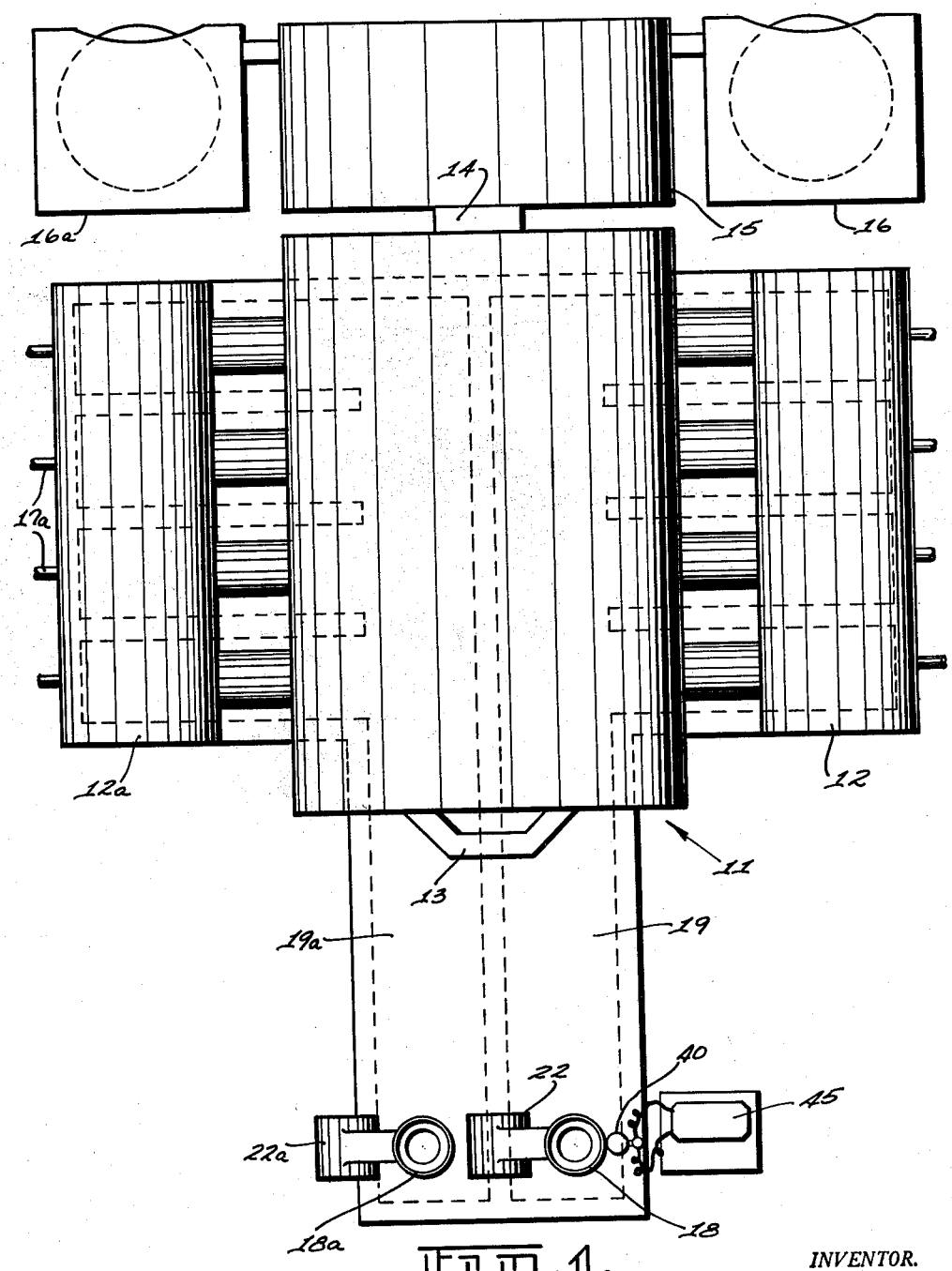
FIG. 1 is a top plan view of a regenerative-type furnace including a pair of stacks for simultaneous introduction of combustion air and withdrawal of waste gases.
Figure 2:
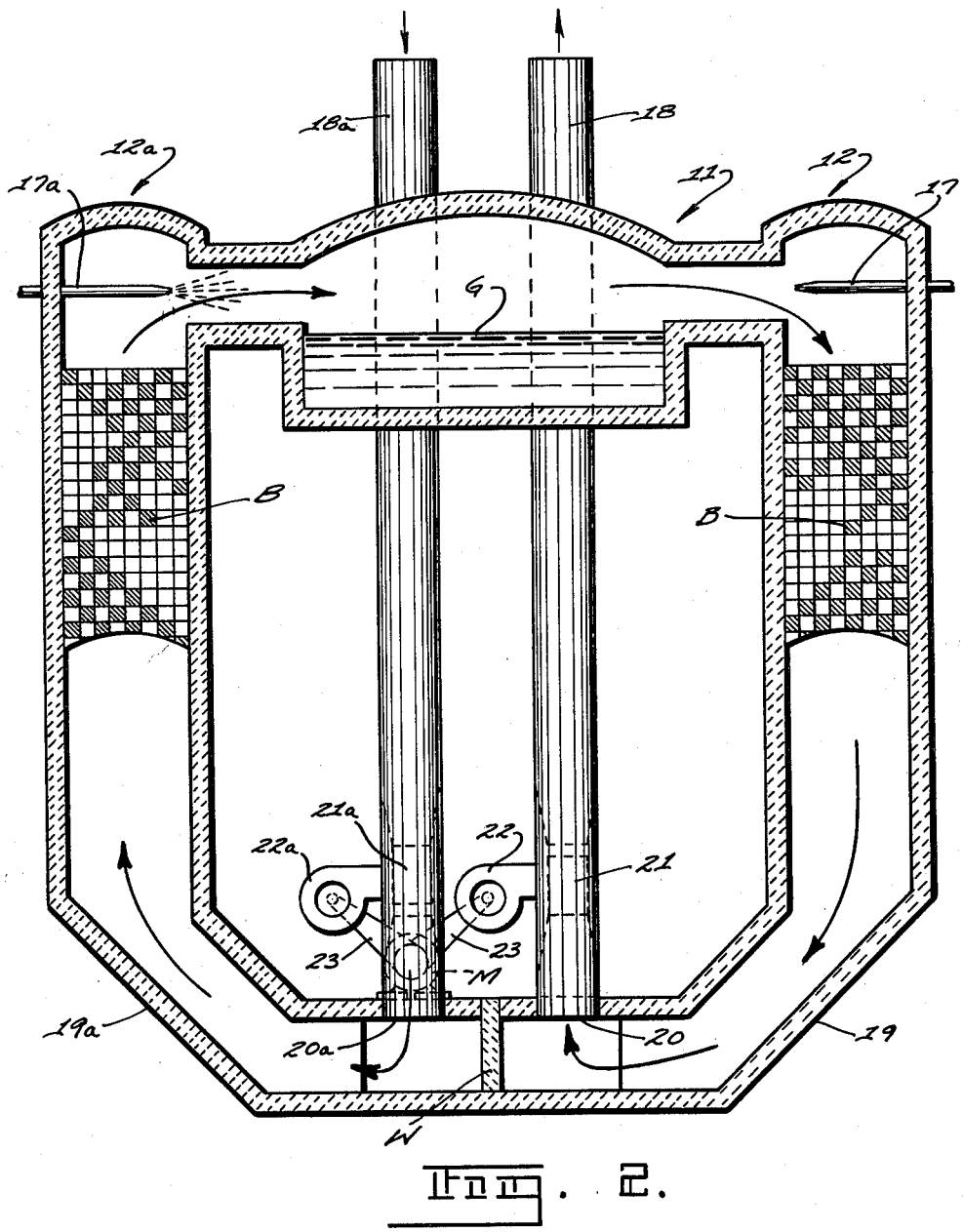
FIG. 2 is a sectional view of the furnace of FIG. 1 and including a schematic illustration of the reversal induced draft apparatus of the invention.

Referring now more specifically to the drawings, and particularly FIGS. 1 and 2, there is disclosed a crown topped furnace 11 having in communication therewith a right hand regeneration chamber 12 and a left hand regeneration chamber 12a. The furnace 11 contains a pool of molten glass G, which is produced from a supply of glass forming ingredients introduced at the dog house 13. The molten glass flows from the furnace 11, through a channel 14, to a forehearth 15 from which it is withdrawn and fed to glass forming machinery, illustrated schematically and identified by the reference numerals 16 and 16a, representing rotary bottle forming machines. The glass forming ingredients are melted by the combustion of fuel emanating from opposed alternately firing nozzles 17a, on the left hand side, and 17, on the right hand side. When fired, as shown in FIG. 2, combustion air enters through left hand stack 18a and proceeds downwardly therethrough to lower left canal 19a, from which the inlet air proceeds up through the left hand regeneration chamber 12a to meet the combustion or fuel gases emanating from the nozzle 17a. The hot waste gases proceed to the right and down through the regeneration chamber 12 and into the right hand lower canal 19, proceeding upwardly and out stack 18. Center wall W separates the right hand canal 19 from the left hand canal 19a. The stacks 18 and 18a are located in registry over canal openings 20 and 20a which open upwardly.

Figure 3:
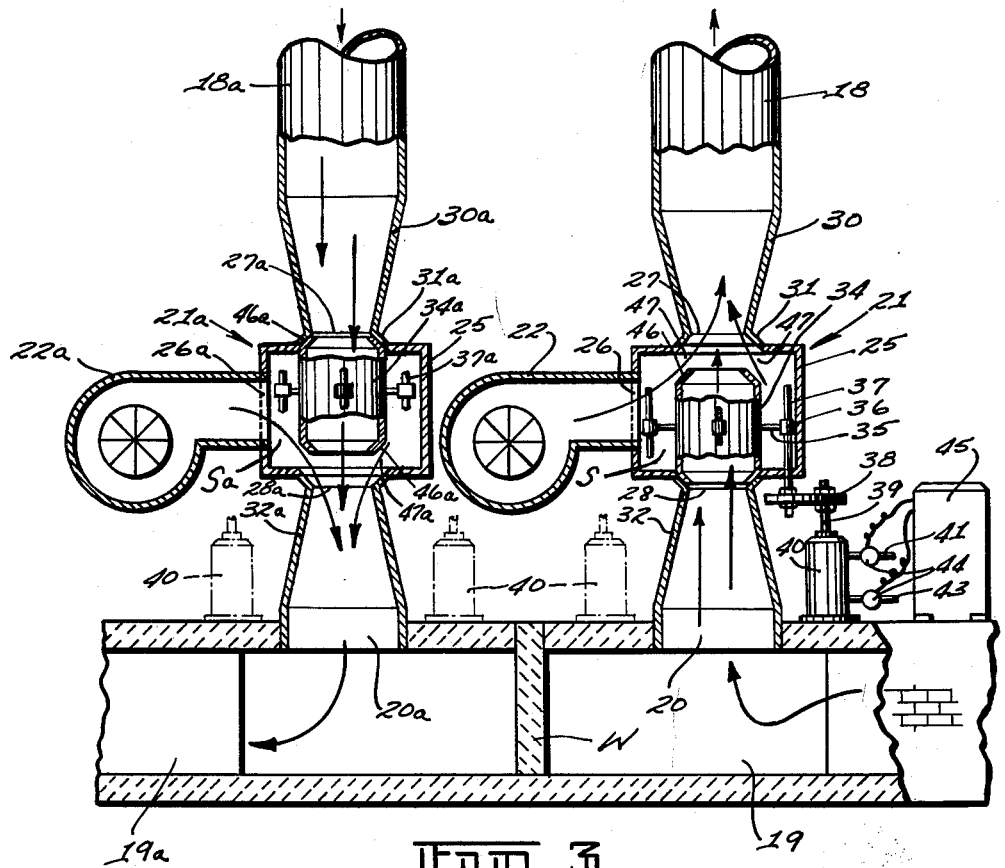
FIG. 3 is a cross sectional view, with portions broken away, of two draft reversal apparatuses constructed in accordance with a preferred embodiment of the present invention and being illustrated mounted in line with a pair of side by side stacks.

Reference numerals 21 and 21a identify the reversible Venturi valves in accordance with the invention and, as shown in FIG. 3, are mounted in line with stack 18 and 18a, respectively. Valve 21 is so adjusted that the gaseous flow is upwardly therethrough, while valve 21a is so adjusted that the flow is downwardly therethrough, connecting with the canal 19a, as indicated by the arrows. The regeneration chambers 12 and 12a contain an array of brick work B, commonly referred to as "checkers," which define a tortuous pathway therethrough, whereby heat is absorbed by the bricks. In accordance with preferred practice the furnace arrangement, as disclosed in FIG. 2, is periodically reversed by appropriate control of the valve apparatus 21 and 21a, whereby the flow is reversed from that shown so that cool inlet air will be brought into contact with the hot "checkers" which have absorbed heat from the hot waste gases. The reference numerals 22 and 22a identify centrifugal blowers which expedite the inlet flow in stack 18a and the outlet flow in stack 18. The centrifugal blowers are connected by belts 23 to a common motor M serving as a source of rotation power.

Figure 4:
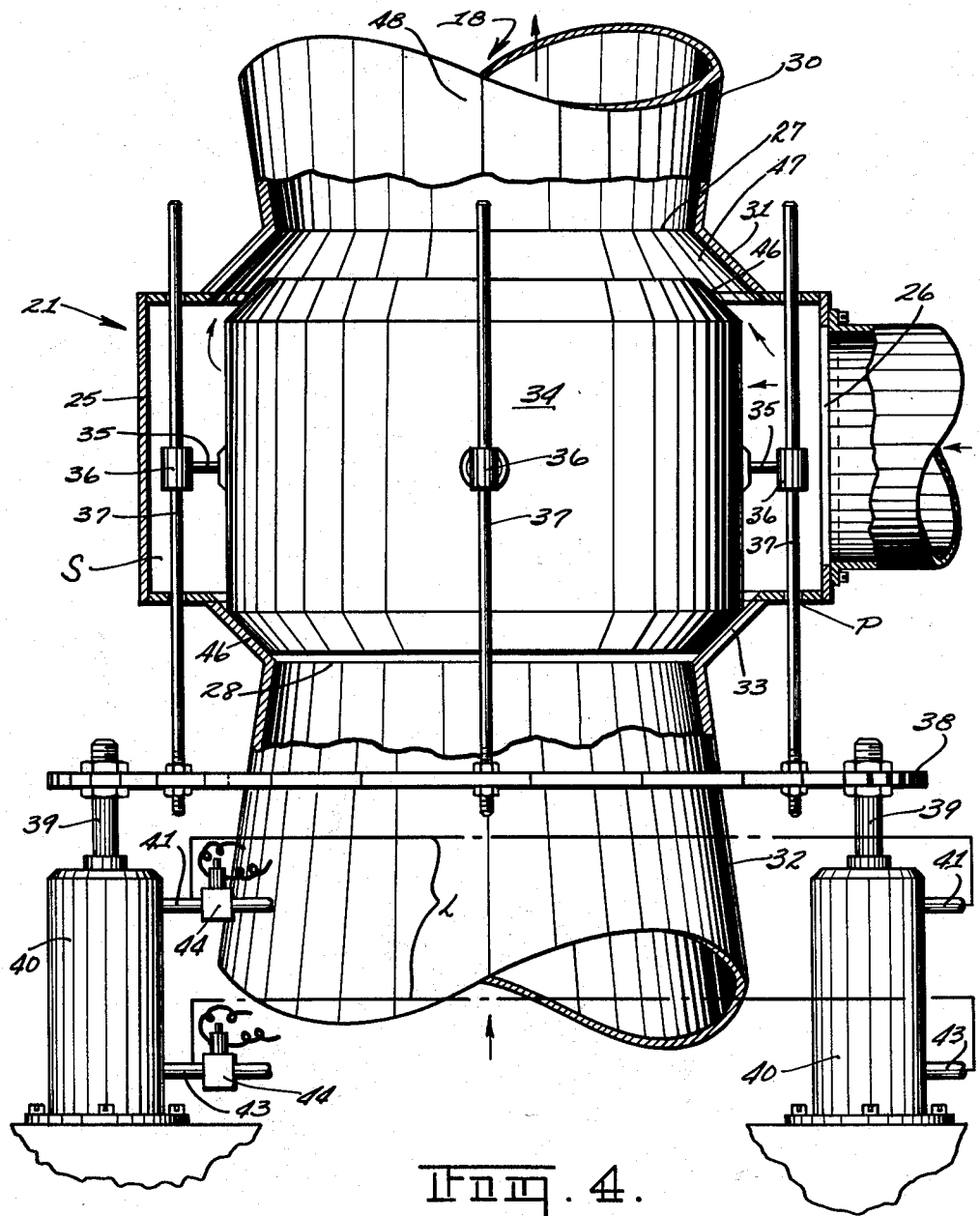
FIG. 4 is a sectional view, greatly enlarged, of one of the reversible Venturi valve apparatuses shown in FIG. 3.

The reversible valving apparatus, in accordance with the present invention, is shown in somewhat more detail in FIG. 3 and greatly enlarged, for purposes of clarity, in FIG. 4. As can be seen from FIG. 3, valves 21 and 21a are situated in side by side relationship in series connection respectively with stacks 18 and 18a. The two valves are for all intents and purposes identical and their elements will be identified by the same reference numerals except that the elements of valve 21a will be identified by the subscript "a." Reference will be had most particularly to the right hand valve 21 which, as shown in FIG. 3 and greatly enlarged in FIG. 4, is in operational position for exhausting hot waste gases from the right hand canal 19, in the direction indicated by the arrows, upwardly through the valve 21 and out the stack 18. The valve is composed of a generally hollow chamber 25 of circular cross section. Centrifugal blower 22 introduces air under pressure through lateral opening 26 in the side of the chamber 25. The chamber 25 also has an upper mouth 27 of restricted size and a lower mouth 28 of restricted size (see reference numeral 28a in the valve 21a). The mouths 27 and 28 are axially aligned with respect to the stack 18. An upwardly and outwardly flaring ductwork 30 defining an upper Venturi section is axially secured to the chamber 25. The ductwork 30 includes an angularly disposed, annular lip 31 contiguous to and connecting with the mouth portion 27. A section of ductwork 32 similar to ductwork 30 is disposed beneath the chamber 25 but flares axially downwardly and outwardly to define a Venturi section. It includes an angularly disposed, annular lip 33 contiguous to and connecting with the lower mouth 28 of the chamber 25.

A generally hollow, open-ended, cylindrical conduit element 34 is located within the chamber 25 in coaxial relationship and is carried on radial spacer arms 35 which terminate in mountings 36 mounted on four vertical spaced arms 37 which are linked as at 38 to the stems 39 of cylinders 40. The stems reciprocate in a vertical direction in response to the pressure within as produced by air or other fluid introduced under pressure to either the inlet 41 or the outlet 43 of the air cylinders. A suitable packing P is employed where the control rods 37 proceed through the wall of the principal chamber 25 in order to insure that no air leakage occurs. Introduction of the fluid into the cylinder 40 is controlled by valves 44 connected to a timer mechanism 45 (not shown in FIG. 4). A suitable timer mechanism is an Eagle Multiflex Timer manufactured by the Eagle Signal Corporation of Moline, Illinois. The stem movement in a vertical direction causes the cylindrical conduit 34 to reciprocate between one of two positions; that is, either the lowermost position as shown in the right hand stack 18 or the uppermost position as shown in the left hand stack 18a. Similar cylinder and piston arrangements, designated by the same reference numerals, e.g. 39 and 40, are employed on the other side of the valve 21, as shown in FIG. 4, and are connected by line L. They are also employed, as shown in phantom line, in connection with left hand valve 21a (FIG. 3).

The open-ended cylinder 34 has spaced upper and lower end edges of angular or chamfered contour, designated by the reference numeral 46, whereby the edges make an effective seal with the angular lips 31 and 33 of the spaced Venturi sections 30 and 32, respectively.

The valve 21 with the open-ended hollow cylinder 34, in the position as shown, operates thusly. Air is supplied under pressure by the centrifugal blower 22, which flows through the opening 26 to the internal annular space S which lies between the chamber 25 and the inner cylinder or sleeve 34. Being under pressure, the air flows out the annular passageway, generally designated by the reference numeral 47, between the edge 46 of the sleeve 34, the mouth 27 and the lip 31, and thence up into the Venturi section 30. This action creates a zone of lower pressure within the hollow cylinder 34. Since the cylinder's lower end is in sealing contact with the lower lip 33, it tends to draw air into it from the canal 19 from which it proceeds up through stack 18. The annular passageway 47 preferably, as disclosed, proceeds convergingly outwardly defining in effect a conical path for the air proceeding from the chamber 25, which path has its apex 48 axially out in the Venturi section.

The position of the inner hollow cylindrical member 34a (FIG. 3) in the left hand valving apparatus 21a is just the opposite of the right hand valving apparatus. Accordingly, a description of the flow conditions therein need not be repeated except to say that, since the cylinder 34 is in an up position, the gaseous flow is induced in an opposite or downward direction, thus proceeding from the upper regions of the stack 18a down into the lower canal 19a, as shown by the arrows in FIG. 3. The two valving apparatuses 21 and 21a are operated in synchronized relationship whereby when one is down in exhausting attitude, as illustrated by valve 21 in FIG. 3, the other valve 21a is in the up position so that it will be drawing combustion air down through the stack. When they are reversed at, for example, in fifteen to twenty minute intervals as determined by vertical shifting of cylinders 34 and 34a controlled by the Multiflex Timer, operating through the air cylinder 40 and the connected linkages, the flow conditions within the stacks 18 and 18a, the canals 19 and 19a and the regneration chambers and furnace system will become reversed.

The supply of air for the valves 21 and 21a, as shown in FIG. 3, proceeds from separate fans or centrifugal blowers 22 and 22a. It will be appreciated that one blower could be employed instead of two and that appropriate ductwork could be employed to connect the single blower to both of the chambers 25 and 25a.

Figure 5:
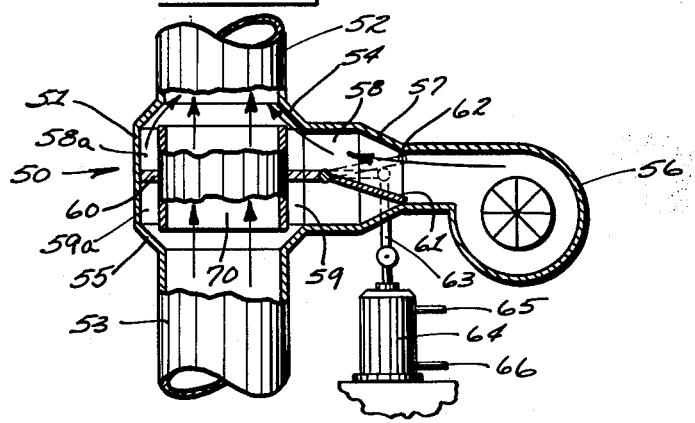
FIG. 5 is a sectional view of a reversible valving apparatus representing another embodiment of the present invention.

Referring now more specifically to FIG. 5, there is disclosed in simplified form another embodiment of the valving arrangement in accordance with the present invention. The valving apparatus 50 includes a generally hollow chamber 51, mounted in series communication with an upper portion 52 and a lower portion 53 of a stack. The chamber 51 is generally of a larger cross sectional area than the stack. It includes an upper segment 54 and a lower segment 55 which are each defined by walls which are angularly disposed. A fixed hollow cylinder 70 is centrally and coaxially mounted within the chamber 51. A centrifugal fan 56 serves to introduce air into the ductwork 57 and through opening 58 and/or opening 59, leading to annular passages 58a or 59a. These latter openings 58 and 59 are defined by the ductwork 57 and also by transverse wall 60, which also separates passages 58a and 59a and supports the cylinder 70. A baffle 61 is pivotably mounted at one end of transverse wall 60 and is free to pivot from the position shown in full line, identified by the reference numeral 61, to the position shown in phantom line, identified by the reference numeral 62. The baffle 61 is controlled in its movement by the stem 63 extending vertically up from cylinder 64. Cylinder 64 is provided with opposite end posts 65 and 66. The pressure therein maintained controls, the amount of extension of the stem 63, and thereby the attitude of the baffle 61. With baffle 61 in the position shown in full line, the air driven by the centrifugal blower 56 proceeds in the direction indicated by the arrows to the annular passageway 58a above central transverse wall 60, passing through passageways defined between the terminal ends of the open-ended cylinder 70 and the angular annular wall segment 54 and thence up the stack 52. The flow-path, as just described, creates a Venturi effect which, in turn, creates a zone of lower pressure within the cylinder 70, thereby inducing exhaust from the lower stack segment 53, since the wall 60 and baffle 61 effectively separate passageways 58a and 59a.

To reverse the operation, the cylinder 64 is activated causing the baffle 61 to move to the position shown in dotted outline and identified by the reference numeral 62. In this position the air delivered by the blower 56 proceeds through the opening 59 to annular passageway 59a and thence between the lower terminus of the open-ended cylinder 70 and the angular annular wall segment 55. This flow-path likewise creates a Venturi effect causing a zone of reduced pressure within the cylinder 70, whereby the flow of air will be expedited therethrough in a downward direction pulling air from the upper segment 52 and delivering it to the lower segment 53 and beyond.

I have disclosed in the foregoing an effective reversal valve apparatus which embodies a dual Venturi feature, permitting very simple and effective reversal of flow, while at the same time the flow is expedited by the novel features of construction.

Those skilled in the art will readily appreciate many advantages, other than discussed herein, as accruing through the use of the extremely functional and novel apparatus provided by the present invention.

Other modifications will readily suggest themselves to those skilled in the art and it is intended that all such obvious equivalent modifications shall be included within the spirit and scope of the present invention unless specifically de-limited by the appended claims.

I claim:

1. A reversible Venturi valve for regenerative-type furnaces, said valve being adapted for series connection in a stack in communication with a regeneration chamber of said furnace, said valve comprising first conduit means defining a Venturi contour expediting flow in one direction, second conduit means defining a Venturi contour expediting flow in the opposite direction, third means for alternately directing a supply of air to first one Venturi and then the other to expedite said flow, and movable fourth conduit means disposed between said first and second conduit means and constructed and arranged for alternate and variable movement between (1) a position communicating with said first conduit means and (2) a position communicating with said second conduit means, whereby flow conditions within said stack are completely variable between maximum flow in one direction and maximum flow in the opposite direction, said fourth conduit means being synchronized with said third means.

2. A reversible Venturi valve for regenerative-type furnaces, said valve being adapted for series connection in a stack in communication with a regeneration chamber of said furnace, said valve comprising first conduit means defining a Venturi contour expediting flow in one direction, second conduit means defining a Venturi contour expediting flow in the opposite direction, air supply means for delivering air pressure greater than atmospheric and greater than the pressure emanating from said regeneration chamber, third means for alternately directing said air to first one Venturi and then the other, and movable fourth conduit means disposed between said first and second conduit means and constructed and arranged for alternate and variable movement between (1) a position communicating with said first conduit means and (2) a position communicating with said second conduit means, whereby flow conditions within said stack are completely variable between maximum flow in one direction and maximum flow in the opposite direction, said fourth conduit means being synchronized with said third means.

3. A reverse flow draft inducing apparatus for connecting a stack with the canal opening of a regeneration chamber of a regenerative-type combustion furnace, said apparatus comprising a generally hollow chamber provided with opposed end portions adapted to communicate respectively with said stack and said canal opening, said end portions each including Venturi effect contours urging flow in diametric directions, a shiftable, generally hollow, open-ended sleeve member, and means for shifting said sleeve axially within said chamber to communicate alternately with said end portions whereby the opposite end of said sleeve and the end portion proximate thereto define therebetween an annular passageway cooperating with the proximate Venturi contour so that air forced into said chamber will create a zone of low pressure in said sleeve and correspondingly in one of said stack and said canal opening depending on the position of said sleeve.

4. A reverse flow, draft-inducing apparatus for connecting a stack with the canal opening of a regeneration chamber of a regenerative-type combustion furnace, said apparatus comprising a generally hollow chamber provided with opposed end portions adapted to communicate respectively with said stack and said canal opening, said end portions each including a neck portion and outwardly flaring extensions therebeyond, a shiftable, generally hollow, open-ended sleeve member having end edges sequentially contactable with said neck portions, means for shifting said sleeve axially so that first one end edge contacts one of said neck portions and then the other end edge contacts the other neck portion, said sleeve edges and neck portions defining an annular passageway first at one end portion and then the other, whereby air forced into said chamber will be adapted to proceed through one of said passageways, creating a zone of low pressure in said sleeve and correspondingly and sequentially in said stack and said canal opening depending on the position of said sleeve.

5. A reverse flow draft inducing apparatus for connecting a stack with the canal opening of a regeneration chamber of a regenerative-type combustion furnace, said apparatus comprising a generally hollow chamber provided with upper and lower end portions adapted to communicate respectively with said stack and said canal opening, said end portions including a restricted neck portion and outwardly flaring extensions therebeyond, a shiftable, generally hollow, open-ended sleeve member having end edges sequentially and sealingly contactable with said neck portions, means for shifting said sleeve axially so that first one end edge contacts said upper neck portion and then the other end edge contacts the lower neck portion, said sleeve edges and neck portions defining annular passageways first at one end portion and then the other, whereby air forced into said chamber will be adapted to proceed through one of said passageways, creating a zone of low pressure in said sleeve and correspondingly and sequentially in said stock and said canal opening depending on the position of said sleeve.

6. A reverse flow draft inducing apparatus for connecting a stack with the canal opening of a regeneration chamber of a regenerative-type combustion furnace, said apparatus comprising a generally hollow chamber provided with spaced opposed end portions adapted to communicate respectively with said stack and said canal opening, a shiftable, generally hollow, open-ended sleeve member having spaced terminal lip segments spaced apart a distance less than the spacing between said opposed end portions, means for shifting said sleeve to and fro axially within said chamber to alternately connect said lip segments of said sleeve with said end portions, whereby the opposite lip segment of said sleeve and the other end portion define therebetween a Venturi expediting flow in first one direction and then the other.

7. A reverse flow draft inducing apparatus for connecting a stack with the canal opening of a regeneration chamber of a regenerative-type combustion furnace, said apparatus comprising a generally hollow chamber provided with spaced opposed end portions adapted to communicate respectively with said stack and said canal opening, a generally hollow, open-ended sleeve member having spaced terminal lips spaced apart a distance less than the spacing between said opposed end portions, said sleeve member being shiftable in reciprocating fashion to bring said lips in alternate contact with said end portions, whereby the opposite lip of said sleeve and the other end portion define a Venturi, so that air forced into said chamber will flow through the annular space between one of said lips and one of said end portions, creating a zone of low pressure in said sleeve and correspondingly in one of said stack and said canal opening depending on the position of said sleeve, and means for shifting said sleeve member axially within said chamber.

8. In a stack for effecting reverse flow, the combination of a generally hollow chamber mounted axially in line with said stack, a hollow open-ended sleeve member axially and shiftably mounted in said chamber, said sleeve having an axial length and cross sectional area less than said chamber thereby defining an annular space about said sleeve means for shifting said sleeve member axially whereby, said sleeve ends are adapted, in shifting, to alternately contact the junctures between said chamber and said stack thereby defining an axial central passageway essentially spanning the axial span of said chamber, said ends of said sleeve and said junctures when not in sealing contact also defining a somewhat restricted annular passageway leading from said annular space and adapted to connect with said stack axially beyond said chamber, and means for introducing air under pressure to said annular space.

9. A reverse flow draft inducing apparatus for in line connection with a stack for a regenerative-type combustion furnace, said apparatus comprising a generally hollow chamber having spaced opposed end portions, a generally hollow open-ended sleeve member having terminal lips spaced apart a distance less than the spacing between said end portions, said sleeve being coaxially and substantially centrally mounted within said chamber defining an annular space therebetween and said chamber, a central transverse wall spanning said annular space defining an upper zone and a lower zone, means for introducing combustion air under pressure to said zones in sequence, whereby said air will pass between the annular passageway between one of said terminal lips and one of said end portions inducing draft within said sleeve and correspondingly in one of said stack and said canal opening.

10. Apparatus as claimed in claim 9, wherein said end portions and lips contiguous to each other define a Venturi.

11. A reverse flow draft inducing apparatus for in line connection with a stack for a regenerative-type combustion furnace, said apparatus comprising a generally hollow chamber having spaced opposed end portions, said end portions characterized by axially and oppositely diverging wall segments defining a somewhat restricted neck segment at each end, a generally hollow open-ended sleeve member having terminal lips spaced apart a distance less than the spacing between said neck segments leaving spaced annular passageways therebetween, said sleeve being coaxially mounted within said chamber defining an annular space therebetween, a delivery duct for air under positive pressure connected to said chamber, a central transverse wall spanning the said annular space between said sleeve and said chamber defining an upper zone and a lower zone, and baffle means carried on said wall extending into said duct and being shiftable to separate said zones and divert said air under pressure to said zone in sequence, whereby said air will pass between one of said annular passageways inducing draft within said sleeve and on opposite sides of said apparatus.

12. A reverse flow draft induction apparatus for connecting a stack and an opening in a canal connecting with a regenerative chamber of a combustion furnace, said apparatus comprising a principal chamber having a cross sectional area larger than said stack and said opening and having axially aligned upper and lower mouths adapted to connect with said stack and said opening, a generally hollow cylinder situated within said chamber having upper and lower edges spaced apart a distance less than the space between said mouths thereby defining annular passageways between said edges and said mouths, said cylinder being shiftable between an upper position with its upper edge in sealing contact with said upper mouth and a lower position with its lower edges in sealing contact with said lower mouth, means for shifting said cylinder, means for introducing air under pressure to said principal chamber, and extensions connected to each of said mouths being of outwardly flaring wall contour creating a Venturi effect the direction of which is dependent upon the position of said cylinder and means for connecting said extensions to said stack and said opening.

13. The apparatus as claimed in claim 12, wherein said mouths and edges are of such contour that there is defined between them, when not in sealing contact, an annular passageway of ever increasing convergence in the direction of gaseous flow.

14. A reversible draft inducing apparatus for a stack for introducing inlet air to or exhausting waste gases from a regenerative-type furnace through a canal opening communicating with said furnace, said apparatus comprising a plenum chamber housing including an upper section of upwardly diverging wall contour adapted to connect with said stack, a lower section of downwardly diverging wall contour adapted to connect with said canal opening, and a central section between said upper and lower sections, said upper and lower sections including throat portions connecting with said central section, a hollow conduit situated in said central section and having upper and lower edges, means for shifting said conduit from an upper position with said upper edge in contact with the throat portion of said upper section to a lower position with said lower edge in contact with the throat portion of said lower section, and means for delivering forced air to said central section whereby said air is adapted to flow in sequence first downwardly through said canal opening pulling air down said stack through said conduit and secondly upwardly through said stack pulling waste gases from said opening.

15. In a regenerative furnace composed of wall structure defining an essentially closed firing zone, opposed regenerator chambers fluidly connected to said zone, and a canal leading from each chamber to a remote opening, the improvement which comprises a stack connecting with each of said openings, and a valve, as claimed in claim 1, in series connection with each of said stacks.

16. In a regenerative furnace composed of wall structure defining an essentially closed firing zone, opposed regeneration chambers fluidly connected to said zone, and a canal leading from each chamber to a remote opening, the improvement comprising stacks connected to each of said openings, and apparatus, as claimed in claim 9, assembled therewith.

17. A furnace as claimed in claim 15, which includes control means connecting said valves for maintaining opposite flow conditions in said stacks.

References Cited by the Examiner
UNITED STATES PATENTS

| | | | |
|---|---|---|---|
| 1,635,939 | 7/27 | Isley | 263—15 |
| 1,801,670 | 4/31 | Isley | 263—15 |
| 1,897,008 | 2/33 | Isley | 263—15 |
| 2,385,153 | 9/45 | Morton | 158—110 X |
| 2,621,049 | 12/52 | Pottmeyer | 137—309 |
| 2,979,322 | 4/61 | Dailey | 263—40 |

CHARLES SUKALO, *Primary Examiner.*
JOHN J. CAMBY, *Examiner.*